United States Patent
Ongole et al.

(10) Patent No.: US 8,050,251 B2
(45) Date of Patent: Nov. 1, 2011

(54) VPN OPTIMIZATION BY DEFRAGMENTATION AND DEDUPLICATION APPARATUS AND METHOD

(75) Inventors: Subrahmanyam Ongole, Cupertino, CA (US); Sridhar Srinivasan, Bangalore (IN)

(73) Assignee: Barracuda Networks, Inc., Campbell, CA (US)

( * ) Notice: Subject to any disclaimer, the term of this patent is extended or adjusted under 35 U.S.C. 154(b) by 390 days.

(21) Appl. No.: 12/421,651

(22) Filed: Apr. 10, 2009

(65) Prior Publication Data

US 2010/0260187 A1 Oct. 14, 2010

(51) Int. Cl.
*H04L 12/28* (2006.01)
(52) U.S. Cl. ............ 370/351; 370/395.32; 709/230
(58) Field of Classification Search .......... 370/230–235, 370/352–357, 395.32; 709/230
See application file for complete search history.

(56) References Cited

U.S. PATENT DOCUMENTS

| | | | | |
|---|---|---|---|---|
| 7,467,202 B2 * | 12/2008 | Savchuk | | 709/224 |
| 7,630,305 B2 * | 12/2009 | Samuels et al. | | 370/229 |
| 7,895,431 B2 * | 2/2011 | Bouchard et al. | | 713/152 |
| 2005/0055399 A1 * | 3/2005 | Savchuk | | 709/203 |
| 2006/0056406 A1 * | 3/2006 | Bouchard et al. | | 370/389 |
| 2009/0003319 A1 * | 1/2009 | Sood et al. | | 370/352 |
| 2009/0138945 A1 * | 5/2009 | Savchuk | | 726/4 |
| 2010/0050040 A1 * | 2/2010 | Samuels et al. | | 714/749 |

* cited by examiner

*Primary Examiner* — Hassan Kizou
*Assistant Examiner* — Emmanuel Maglo
(74) *Attorney, Agent, or Firm* — Patentry (57) ABSTRACT

An apparatus for optimizing a virtual private network operates by defragmenting and deduplicating transfer of variable sized blocks. A large data object is converted to a plurality of data paragraphs by a fingerprinting method. Each data paragraph is cached and hashed. The hashes are transmitted between a primary and a satellite apparatus. Only data paragraphs which are not cached at both the primary and satellite are transferred. The data object is integrated from data paragraphs stored in cache and transmitted to its destination IP address.

5 Claims, 10 Drawing Sheets

VPN OPTIMIZATION BY DEFRAGMENTATION AND DEDUPLICATION APPARATUS AND METHOD

BACKGROUND

1. Technical Field

The present invention relates generally to network communications over TCP/IP and more particularly to connecting low bandwidth services between local area networks (LANs) and ameliorating packet fragmentation.

2. Description of Related Art

It is known that virtual private networks (VPN) allow remote employees access to an enterprise's information systems. VPNs are used to connect remote offices to headquarters for time critical enterprise resource management operations.

The communication network typically comprises a public network (e.g., the Internet). The connections to the communication network from the branch office and the central office typically cause a bandwidth bottleneck for exchanging the data over the communication network. The exchange of the data between the branch office and the central office, in the aggregate, will usually be limited to the bandwidth of the slowest link in the communication network aggravated by the latency imposed by encryption and decryption of the VPN overhead.

For example, the router connects to the communication network by a T1 line, which provides a bandwidth of approximately 1.544 Megabits/second (Mbps). The router 170 connects to the communication network by a T3 line, which provides a bandwidth of approximately 45 Megabits/second (Mbps). Even though the communication network may provide an internal bandwidth greater than 1.544 Mbps or 45 Mbps, the available bandwidth between the branch office and the central office is limited to the bandwidth of 1.544 Mbps (i.e., the T1 connection).

Moreover, many applications do not perform well over the communication network due to the limited available bandwidth. Developers generally optimize the applications for performance over a local area network (LAN) which typically provides a bandwidth between 10 Mbps to Gigabit/second (Gbps) speeds. The developers of the applications assume small latency and high bandwidth across the LAN between the applications and the data. However, the latency across the communication network typically will be 100 times that across the LAN, and the bandwidth of the communication network will be 1/100th of the LAN.

Connecting a branch office to headquarters is likely to involve tying two local area networks to routers which are connected by a wide area network. This requires traversing a number of gateways controlled by different parties. The maximum packet size (also called the MTU, or Maximum Transmission Unit) and default packet size can vary depending on the media. For ethernet (LAN), the max packet size is 1500 octets. For token ring and FDDI, it is 4096 octets. The IP protocol was designed for use on a wide variety of transmission links. Although the maximum length of an IP datagram is 64K, most transmission links enforce a smaller maximum packet length limit, called an MTU. The value of an MTU depends on the type of the transmission link.

The design of IP accommodates MTU differences by allowing routers to fragment IP datagrams as necessary. The receiving station is responsible for reassembling the fragments back into the original full size IP datagram. As the IP packets are routed independently of each other, different packets between the same end hosts could take different routes with varying MTU sizes. However, the lack of end-to-end information can quickly result in oversized packets being received by the intermediate routers that have to route them somehow. The IP protocol provides a convenient solution: the IP fragmentation, a mechanism where a single inbound IP datagram is split into two or more outbound IP datagrams. The worst impact of IP fragmentation is in the router-to-router communication. If a router-to-router IP packet is fragmented somewhere in the path, the receiving router has to reassemble the original packet, resulting in significantly reduced switching performance.

An additional problem with deployment of VPNs is that there is latency introduced by the encryption and decryption of transmissions. Because of the encryption of traffic, the same files transmitted twice will not look the same and this prevents conventional caching strategies.

For example, in a centralized server implementation having multiple branches, computers in each of the multiple branch offices make requests over the VPN to central servers for the organization's data. The data transmitted by the central servers in response to the requests quickly saturate the available bandwidth of the central office's connection to the communication network, further decreasing application performance and data access at the multiple branch offices. This is particularly troublesome for entities which span multiple timezones as congestion can dominate the work day.

It is also known that mechanisms for caching improve application performance and data access. A cache is generally used to reduce the latency of the communication network (e.g., communication network) forming the VPN (i.e., because the request is satisfied from the local cache) and to reduce network traffic over the VPN (i.e., because responses are local, the amount of bandwidth used is reduced).

Webpage caching, for example, is the caching of web documents (i.e., HTML pages, images, etc.) in order to reduce web site access times and bandwidth usage. Web caching typically stores local copies of the requested web documents. The web cache satisfies subsequent requests for the web documents if the requests meet certain predetermined conditions.

One problem with web caching is that the Time to Live parameter is generally not easily changed. Thus the management of a web cache is at least tricky and not conveniently purged or updated. Every browser can have a slightly different version of a document. Another problem is that the web cache stores entire objects (such as documents) and cache-hits are binary: either a perfect match or a miss. Even where only small changes are made to the documents, the web cache cannot use the cached copy of the documents to reduce network traffic.

It is also known that randomly chosen polynomials are used to "fingerprint" bit-strings. This method, first published by Michael O. Rabin Center for Research in Computing Technology Harvard University Report TR-15-81 (1981), is applied to produce a very simple string matching algorithm and a procedure for securing files against unauthorized changes. The method is provably efficient and highly reliable. However it is also known that the Rabin fingerprinting scheme is not as secure as more expensive cryptographic hash functions.

It is known that the Rabin-Karp algorithm is a string searching algorithm created by Michael O. Rabin and Richard M. Karp in 1987 that uses hashing to find a substring in a text. It is used for multiple pattern matching rather than single pattern matching. Running time performance is considered a reason that it is not widely used. However, it has the advantage of being able to find any one of kstrings or less in a predictable time regardless of the magnitude of k.

References: U.S. Pat. Nos. 5,511,159, 5,627,748, 5,778,231, 5,953,006, and

U. Manber, "Finding Similar Files In a Large File System", Proc. 1994 Winter Usenix Technical Conference, January 1994, pp. 1-10.

B. S. Baker, "Parameterized Pattern Matching: Algorithms and Applications," J. Comput. Syst. Sci. 52(1), February 1996, pp. 28-42.

B. S. Baker, "Parameterized Duplication In Strings: Algorithms and an Application to Software Maintenance," SIAM J. Computing, 26(5), October 1997, pp. 1343-1362.

E. W. Myers, "An O(ND) Difference Algorithm and Its Variations," Algorithmica, 1986, pp. 1:251-266.

B. S. Baker, "On Finding Duplication and Near-duplication in Large Software Systems," Second Working Conference on Reverse Engineering, 1995, pp. 86-95.

H. L. Berghel and D. L. Sallach, "Measurements of Program Similarity in Identical Task Environments," SIGPLAN Notices, 9(8), August 1984, pp. 65-76.

S. Brin, J. Davis, and H. Garcia-Molina, "Copy Detection Mechanisms For Digital Documents," Proceedings of the ACM Special Interest Group on Management of Data (SIGMOD), 1995, pp. 1-21.

A. Broder, S. Glassman, M. Manasse, and G. Zweig, "Syntactic Clustering of the Web," Proceedings of the Sixth International World Wide Web Conference, April 1997, pp. 391-404.

K. W. Church and J. I. Helfman, "Dotplot: A Program For Exploring Self-similarity In Millions of Lines of Text and Code," Journal of Computational and Graphical Statistics, 2(2), June 1993, pp. 153-174.

N. Heintz, "Scalable Document Fingerprinting," Proceedings of the Second USENIX Workshop on Electronic Commerce, Nov. 18-21, 1996, pp. 1-10.

S. Horwitz, "Identifying the Semantic and Textural Differences Between Two Versions of a Program," Proceedings of the ACM SIGPLAN Conference on Programming Language Design and Implementation (PLDI), June 1990, pp. 234-245.

H. T. Jankowitz, "Detecting Plagiarism in Student PASCAL Programs," Computer Journal, 31(1), 1988, pp. 1-8.

J. H. Johnson, "Substring Matching For Clone Detection and Change Tracking," Proc. International Conf. on Software Maintenance, 1994, pp. 1-7.

PocketSoft. .RTPatch Professional, Feb. 23, 1998

T. Proebsting and S. A. Watterson, Krakatoa: Decompilation in Java (does bytecode reveal source:). USENIX Conference on Object-oriented Technologies and Systems, June 1997, pp. 1-13.

N. Shivakumar and H. Garcia-Molina, "Building a Scalable and Accurate Copy Detection Mechanism," Proceedings of 1st ACM International Conference on Digital Libraries (DL'96), March 1996, pp. 1-9.

*On finding duplication in strings and software*, technical report, AT&T Bell Laboratories, February, 1993

Cormen, Thomas H.; Leiserson, Charles E.; Rivest, Ronald L.; Stein, Clifford (Sep. 1, 2001). "The Rabin-Karp algorithm". *Introduction to Algorithms* (2nd edition ed.). Cambridge, Mass.: MIT Press. pp. 911-916. ISBN 978-0262032933.

It is also known that a hash function is any well-defined procedure or mathematical function which converts a large, possibly variable-sized amount of data into a small datum. The values returned by a hash function are called hash values, hash codes, hash sums, or simply hashes. In the present patent application we define a variable-sized amount of data converted to a hash as a data paragraph. A circuit is disclosed for selecting data paragraphs from a data object. That portion of a data object which is below the minimum size of a data paragraph is defined as a remainder.

It is known that hash functions are used to speed up table lookup or data comparison tasks—such as finding items in a database, detecting duplicated or similar records in a large file, finding similar stretches in DNA sequences, and so on.

Thus it can be appreciated that connecting branch offices with enterprise applications presents bandwidth, security, and data integrity problems which are aggravated by virtual public networks. What is needed is a way to address VPN fragmentation, data duplication and enable low latency, high responsiveness for users who must live remotely through an encrypted, low bandwidth link from their central datacenter and applications.

SUMMARY OF THE INVENTION

A first apparatus divides a data object into one or more data paragraphs of minimum size and a remainder if the minimum size requirement for a data paragraph is not met. Each data paragraph is submitted to a hash function. On the condition that the hash has not previously been sent to or received from a destination, the paragraph is transmitted to the destination. On the condition that all necessary data paragraphs are cached at the second apparatus, the first apparatus transmits the hashes and if necessary the remainder which the second apparatus uses to reconstitute the data object.

In an embodiment, the second apparatus receives a list of the hashes for data paragraphs pending transfer and updates the first apparatus on unnecessary transfers to optimize the VPN traffic.

Each data paragraph is determined by sequentially computing a low-cost cumulative fingerprint on byte boundaries of the data object and stopping on one of two conditions: that the fingerprint matches a mask or that the data paragraph has reached a maximum desired size. The fingerprint is discarded and more expensive hash is computed and saved to identify the data paragraph.

The invention addresses the above problems by providing a VPN defragmentation and deduplication apparatus, method, and software product. A first apparatus includes a communication interface configured to communicate with a communication network and a processor. The processor receives a data object and converts it to data paragraphs each of which has a hash value. The apparatus generates a packet containing all the hashes and transmits it to a second apparatus through a communications network.

Advantageously, the first apparatus does not transfer a data paragraph over the communication network if the data paragraph is cached at the second apparatus. The first apparatus effectively reduces latency over the communication network, and reduces network traffic by minimizing the amount of data sent over the communication network. As a result, the effective maximum transmission unit (MTU) for remote office traffic can approach that of local networked users connected by Ethernet.

DETAILED DISCLOSURE OF EMBODIMENTS

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

To provide improved application performance and data access, the VPN defragmentation system generally comprises a first apparatus and a second apparatus. The first apparatus receives a data object and converts it to a plurality of hashes which corresponds to data paragraphs stored in cache. Some of the data paragraphs must be transferred to the second apparatus and others not.

The VPN defragmentation and deduplication system provides that the second apparatus processes the hashes and reconstitutes the original data object and transmits it to the original destination. Thus, the VPN defragmentation and deduplication system operates to reduce latency and network traffic over the communication network.

Figure 1:
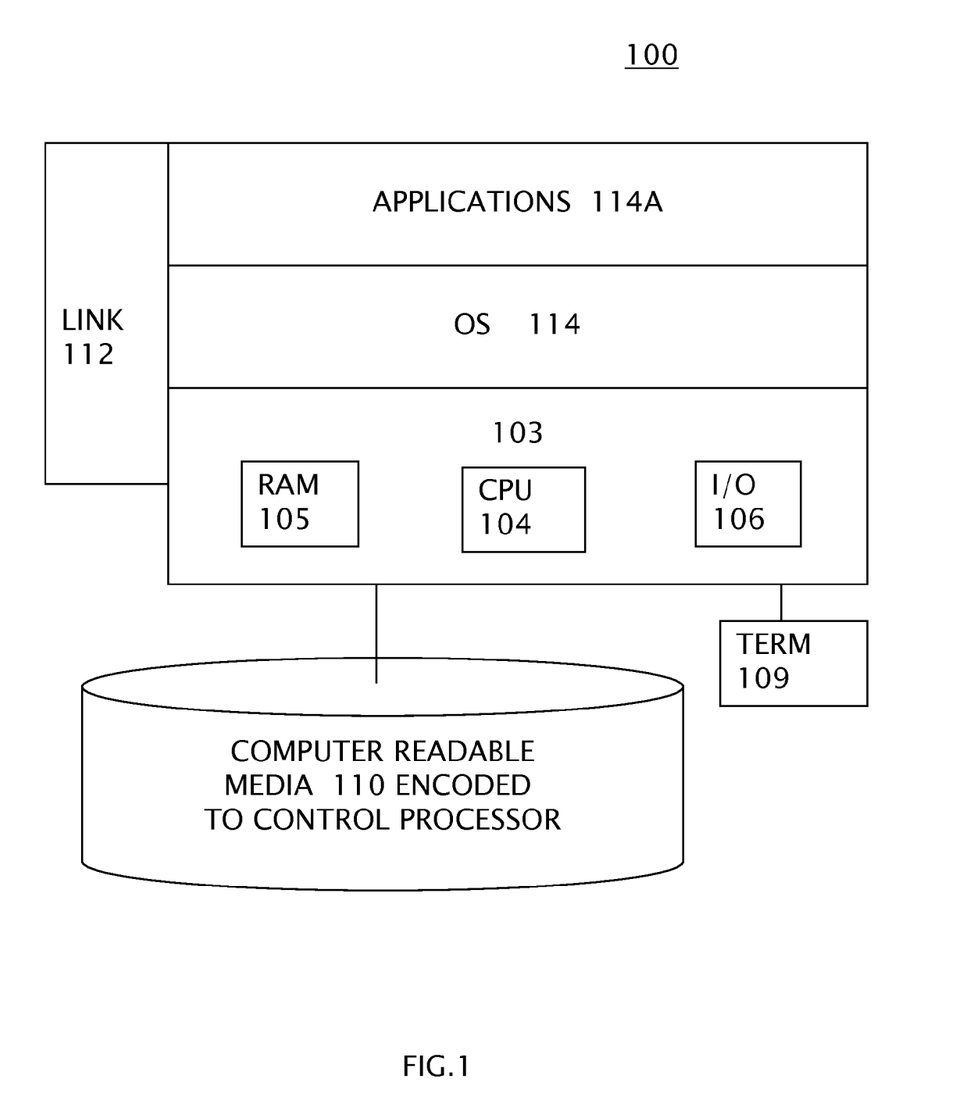
FIG. 1 is a block diagram of a computer.

FIG. 1 shows a block diagram of a typical computing system 100 where the preferred embodiment of this invention can be practiced. The computer system 100 includes a computer platform having a hardware unit 103, that implements the methods disclosed below. The hardware unit 103 typically includes one or more central processing units (CPUs) 104, a memory 105 that may include a random access memory (RAM), and an input/output (I/O) interface 106. Microinstruction code 107, may also be included on the platform 102. Various peripheral components may be connected to the computer platform 102. Typically provided peripheral components include an external data storage device (e.g. flash, tape or disk) 110 where the data used by the preferred embodiment is stored. A link 112 may also be included to connect the system 100 to one or more other similar computer systems. The link 112 may also provide access to the global Internet. An operating system (OS) 114 coordinates the operation of the various components of the computer system 100, and is also responsible for managing various objects and files, and for recording certain information regarding same. Lying above the OS 114 is an application and software tools layer 114A containing, for example, compilers, interpreters and other software tools. The interpreters, compilers and other tools in the layer 114A run above the operating system and enable the execution of programs using the methods known to the art.

An example of a suitable CPU is a Xeon™ processor (trademark of the Intel Corporation); examples of an operating systems is GNU/Linux; examples of an interpreter and a compiler are a Perl interpreter and a C++ compiler. Those skilled in the art will realize that one could substitute other examples of computing systems, processors, operating systems and tools for those mentioned above. As such, the teachings of this invention are not to be construed to be limited in any way to the specific architecture and components depicted in FIG. 1.

Figure 2:
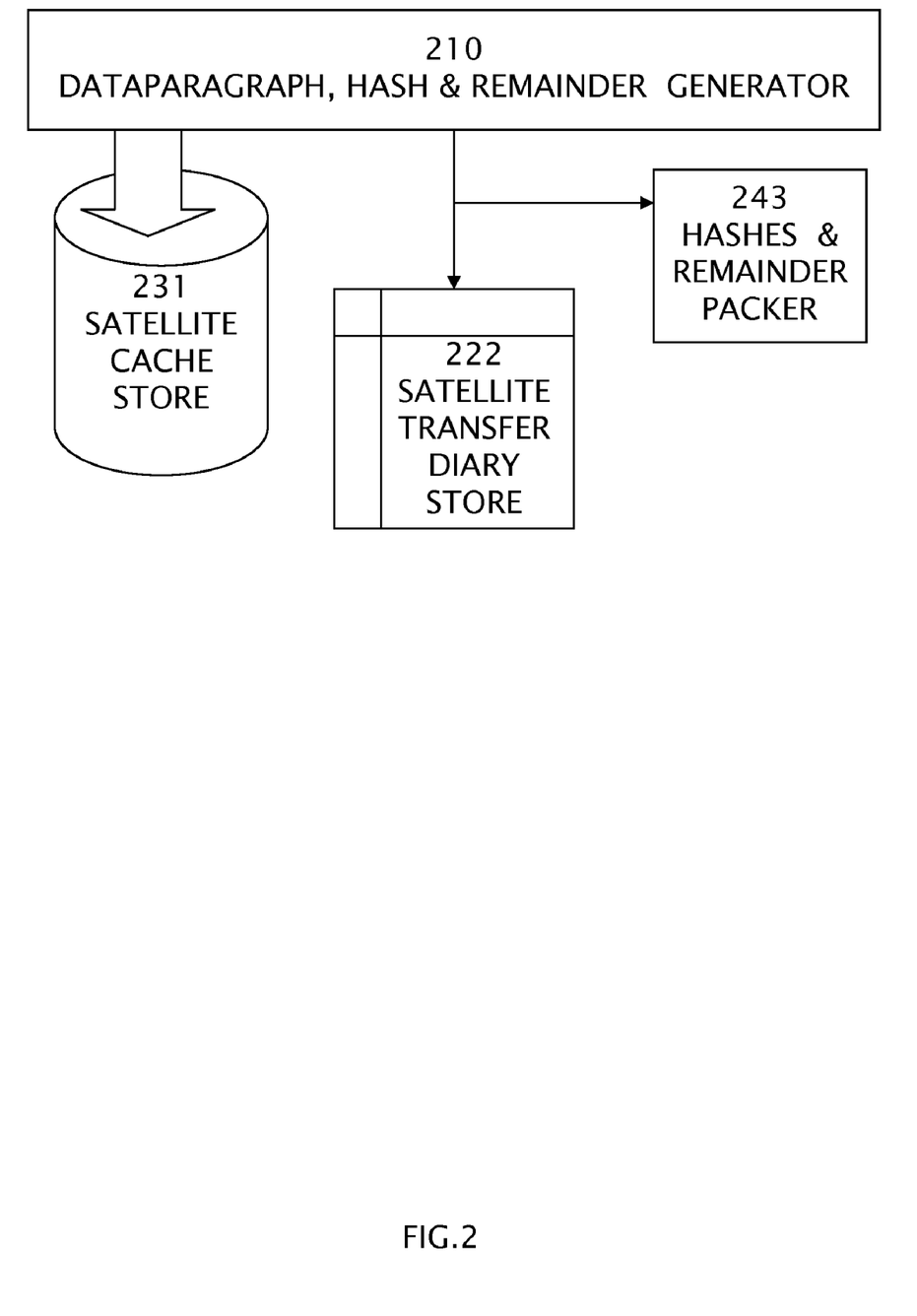
FIG. 2 is a block diagram of portions of a satellite apparatus.

Referring now to FIG. 2 a large data object is received by circuit 210 to generate a plurality of data paragraphs, hashes, and a remainder. The data paragraphs are variable in size between a minimum size and a maximum size. In an embodiment the data paragraphs are fingerprinted and when the fingerprint matches a mask a variable size length block is transferred to a circuit to compute a hash value. The hash and the data paragraph are stored in a satellite cache store 231 if the hash is not already stored there. The hash and the reception apparatus address are stored in the satellite transfer diary store 222 with "pending" for transfer date if the hash and destination apparatus are not already stored there. If the hash and the destination apparatus are already stored there, the transfer date is updated to the present time. As each hash is computed it is transferred to a circuit 243 for packing hashes and a remainder into a data object integration packet along with the destination of the data object. It is understood that a reception apparatus may cache a data paragraph which will be required for several data objects and/or being transferred to more than one TCP/IP destination.

Figure 3:
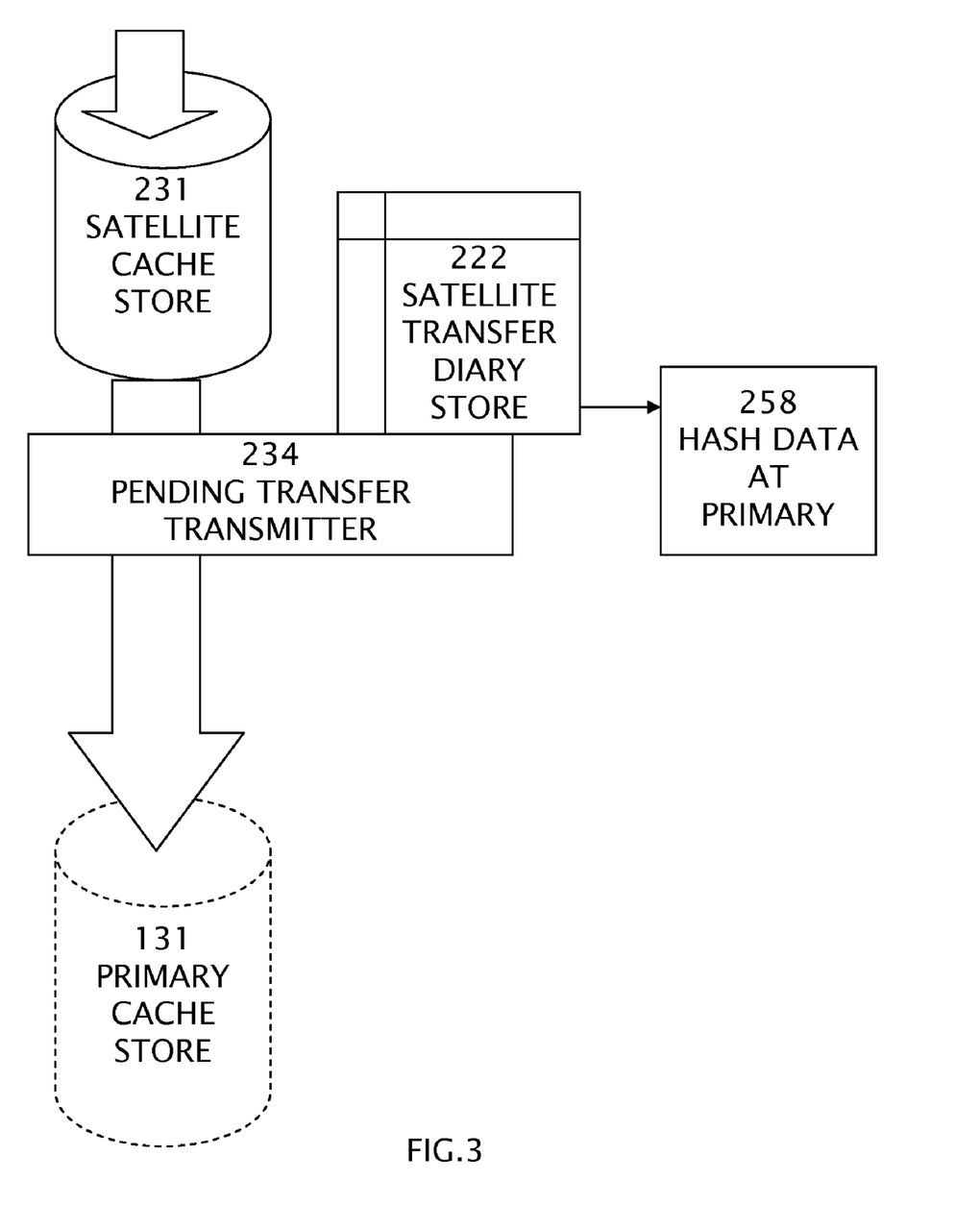
FIG. 3 is a block diagram of portions of a satellite apparatus.

Referring to FIG. 3, as each hash record is stored or updated into the satellite transfer diary store 222, a circuit 234 for transmitting pending transfers queues transfers from the satellite cache store 231 to the primary cache store 131. In an embodiment, illustrated in FIG. 4, the circuit 234 to transmit pending transfer also sends a list of pending transfers to a circuit to receive pending transfer. In an embodiment, the circuit 136 to receive a pending transfer checks a primary transfer diary store 122 to determine if the hash is already stored in the primary store cache. Under the condition that a hash is already stored in the primary cache store 131, the circuit to receive pending transfer updates the status of the satellite transfer diary store 222 from pending to past whereby a data paragraph transfer is removed from the queue of the circuit for pending transfer. When the circuit to transmit a pending transfer completes a transfer, the status in the satellite transfer diary store 222 is updated from pending to past. In an embodiment the current date-time represents the past and all 1's represents pending.

Figure 4:
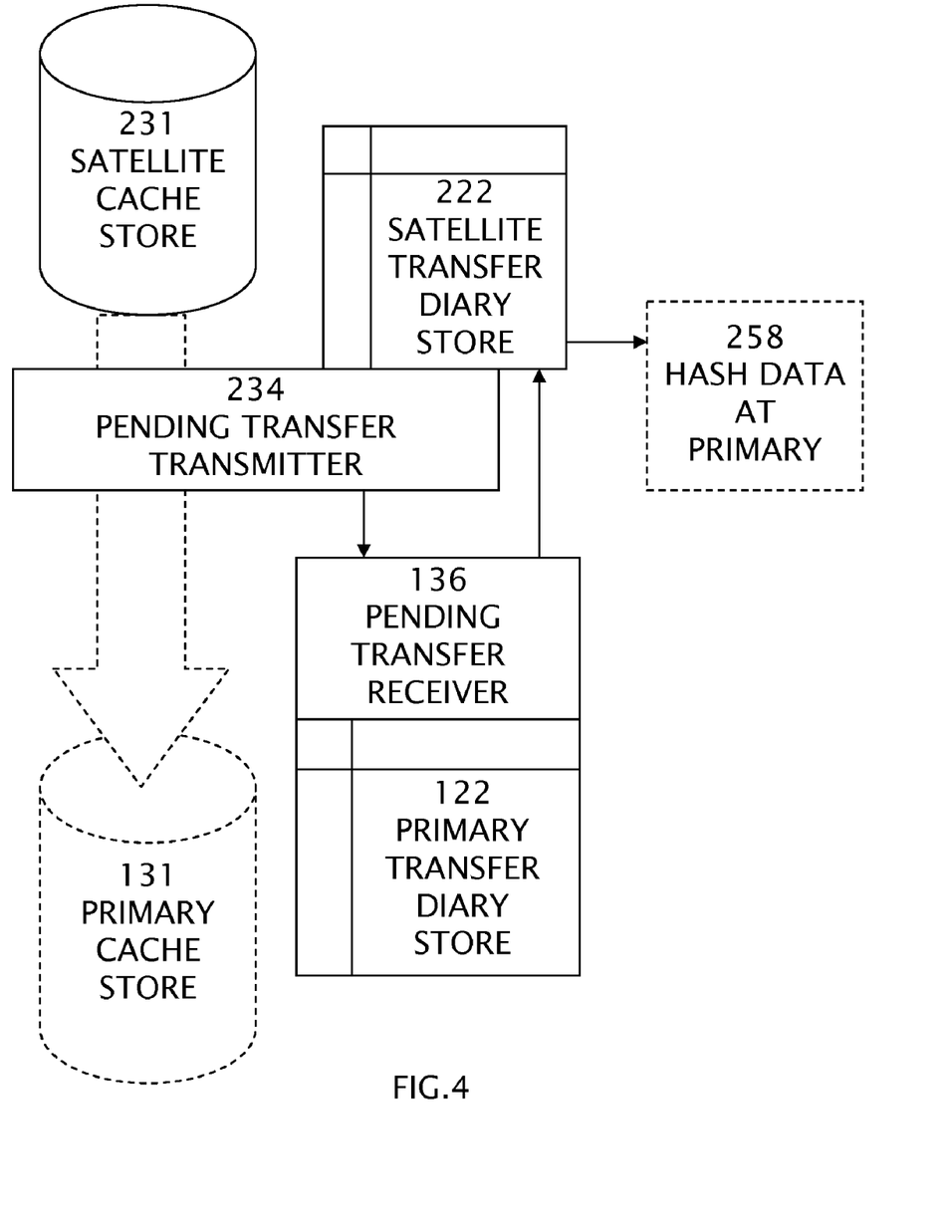
FIG. 4 is a block diagram of portions of a satellite apparatus and a primary apparatus.

Upon the condition that a data object can provide no further data paragraphs and thus no further hashes the rest of the data object is transferred as a remainder to a circuit 243 for packing a data object integration packet.

Figure 5:
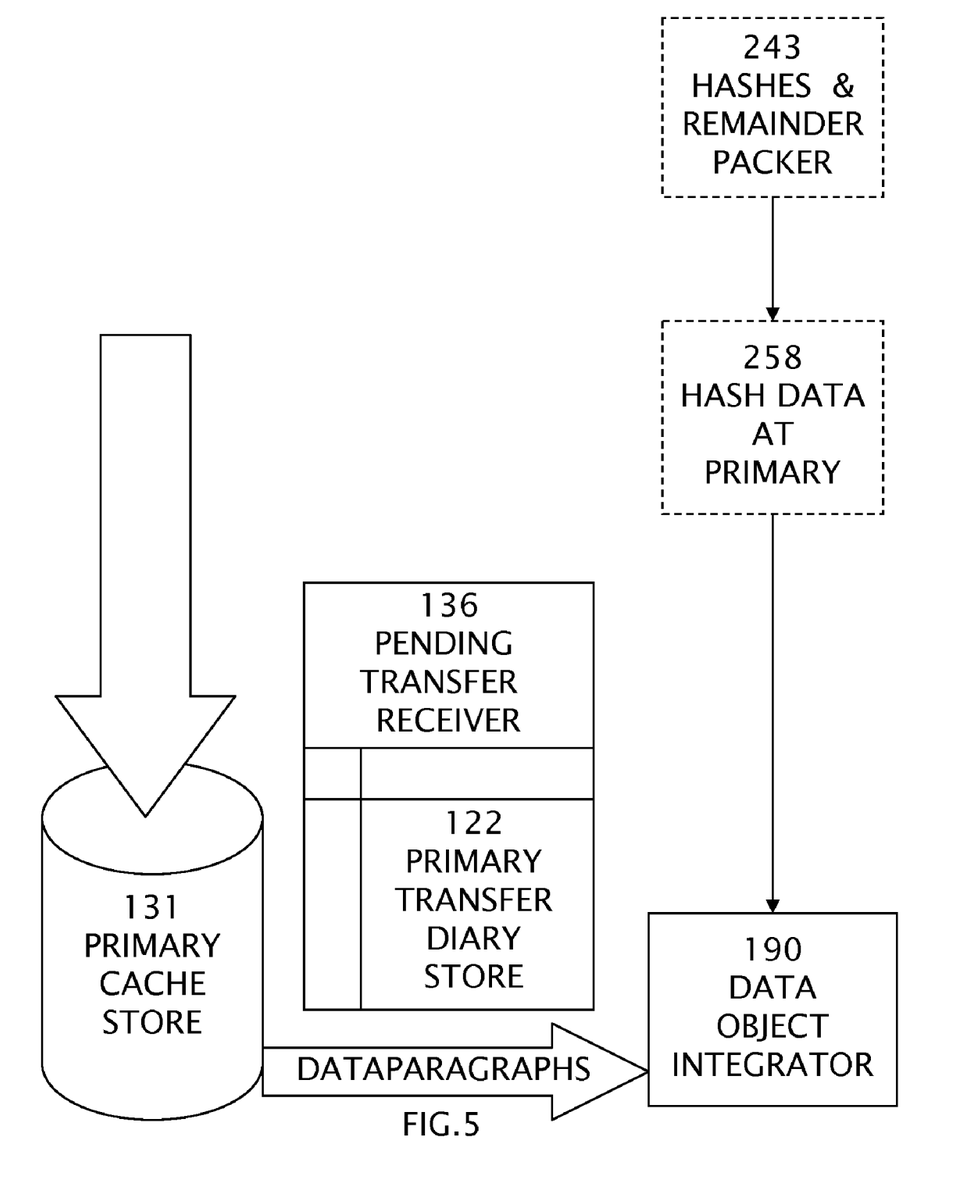
FIG. 5 is a block diagram of portions of a primary apparatus.

Referring to FIG. 5, upon the condition that all pending transfers for a specific data object have been completed, a circuit 258 for determining that all hashes related to a data object are located in the primary cache store enables the transmission of the data object integration packet to the destination.

A circuit 190 to integrate data objects retrieves the data paragraphs specified by hashes in the data object integration packet. To this is concatenated the remainder thus integrating the original data object.

Figure 6:
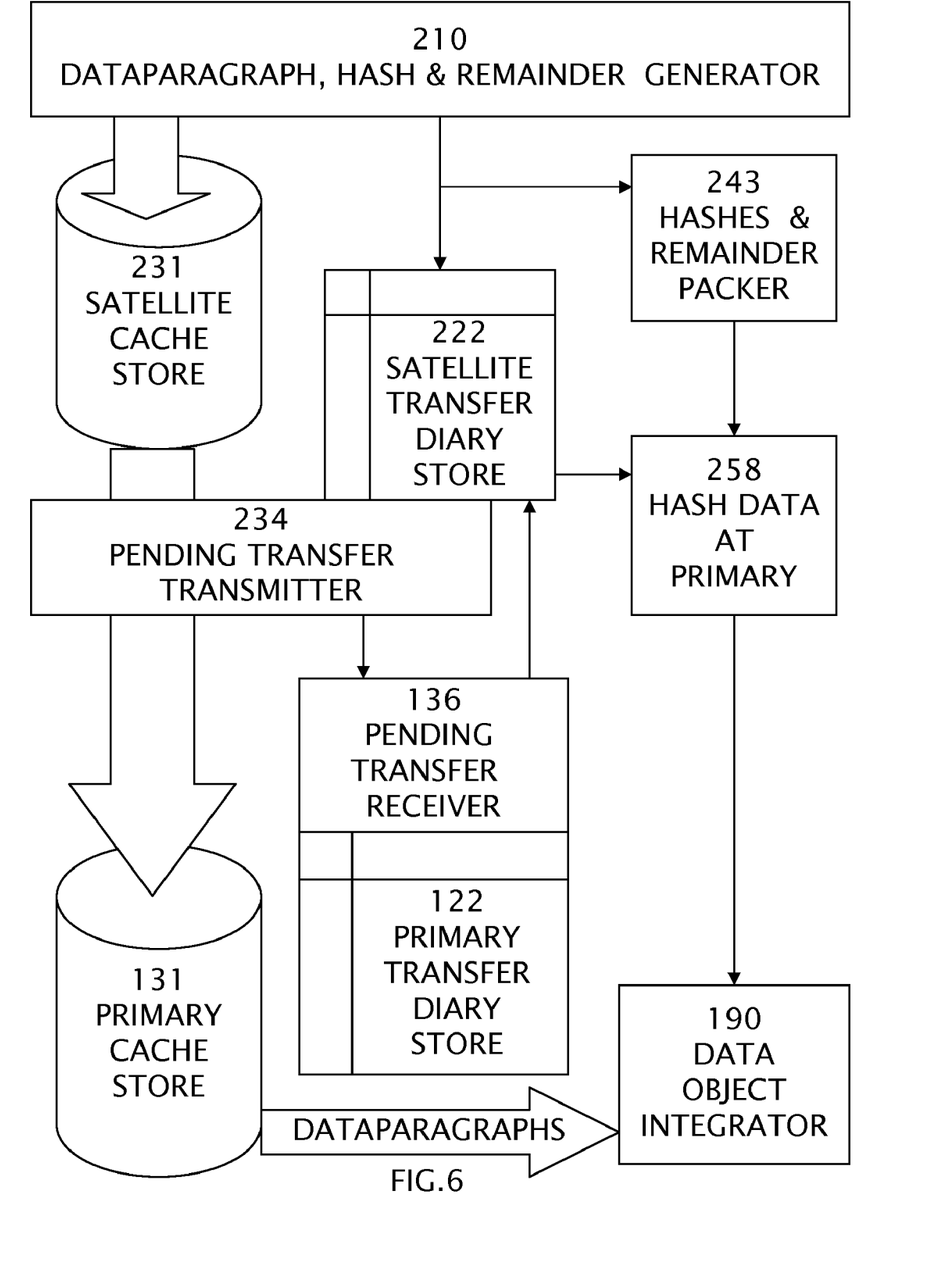
FIG. 6 is a block diagram of a system of a satellite apparatus and a primary apparatus.

FIG. 6 illustrates a first satellite apparatus and a primary apparatus. It is understood and appreciated that a plurality of satellites is supported by a primary apparatus.

Figure 7:
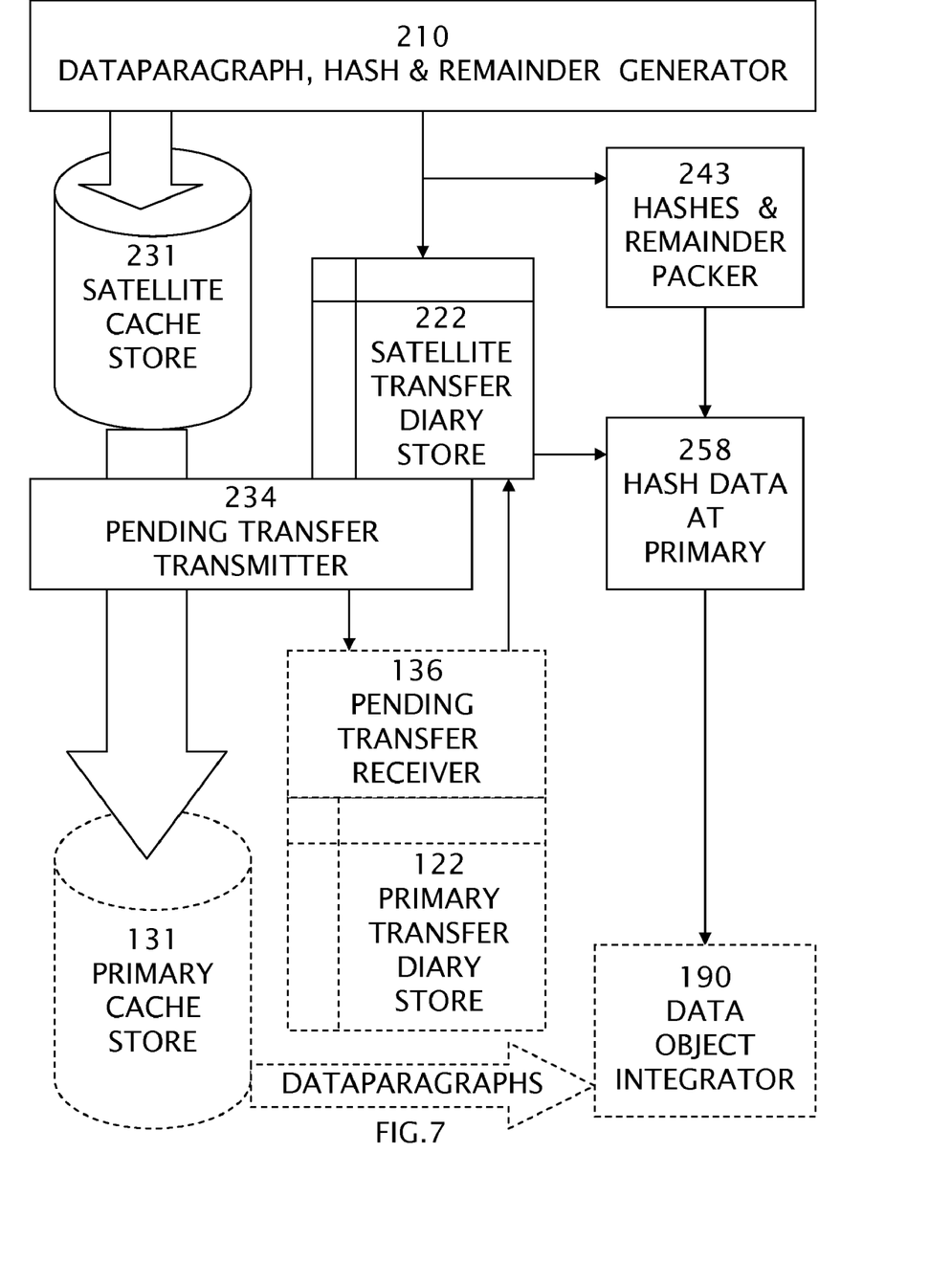
FIG. 7 is a block diagram of a best mode of a satellite apparatus.
Figure 8:
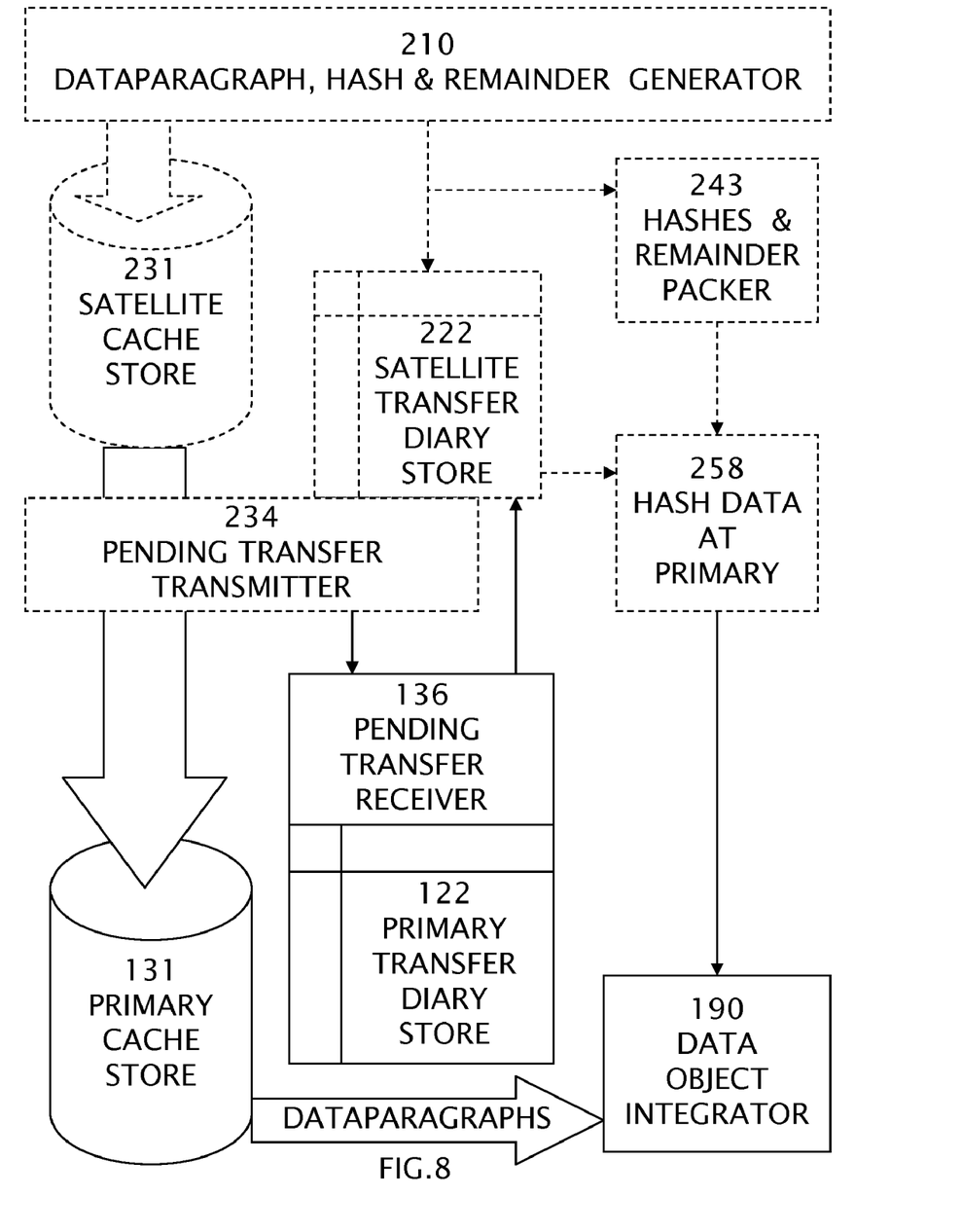
FIG. 8 is a block diagram of a best mode of a primary apparatus.

FIG. 7 is a block diagram of a satellite apparatus. FIG. 8 is a block diagram of a primary apparatus. The primary transfer diary store records all transfers between the primary and any satellite. A satellite transfer diary store records the transfers between itself and its primary. In an embodiment, some or all of the data paragraphs stored at the primary cache store are distributed in anticipation of future use at selected or all satellites. In an embodiment, purging of outdated data paragraphs may be synchronized from the primary to any one or all of the satellites.

Figure 9:
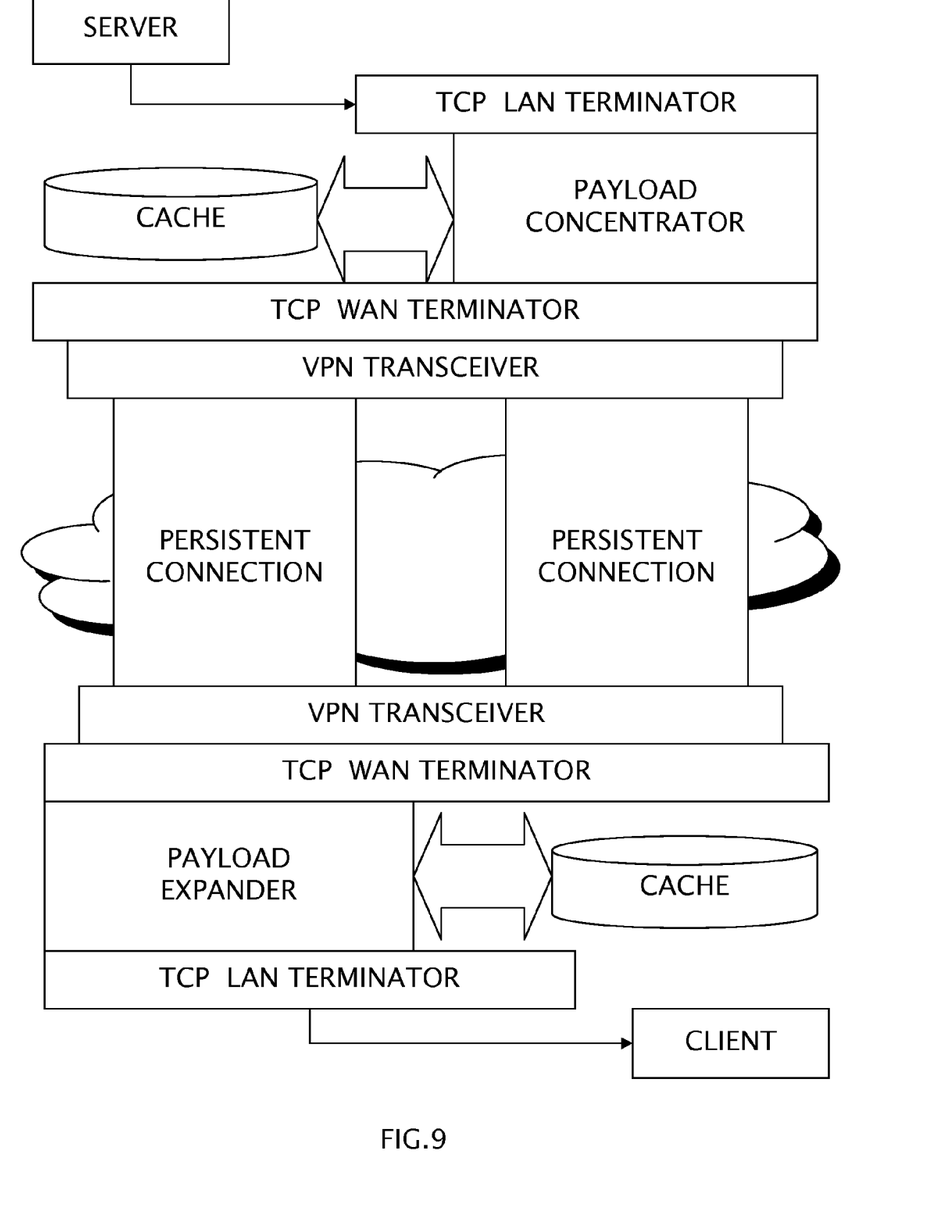
FIG. 9 is a block diagram of a system of two apparatus operating over a wide area network.

FIG. 9 illustrates an embodiment of the invention connecting a primary apparatus to a satellite apparatus through a plurality of persistent connection operating a Virtual Private Network over a Wide Area Network. The TCP connection between the primary and satellite opens large windows through the VPN system. The large windows enable transfers of variable blocks from one cache to another as well as transfers of the hashes which reference variable blocks stored in each cache with minimum TCP/IP fragmentation.

Figure 10:
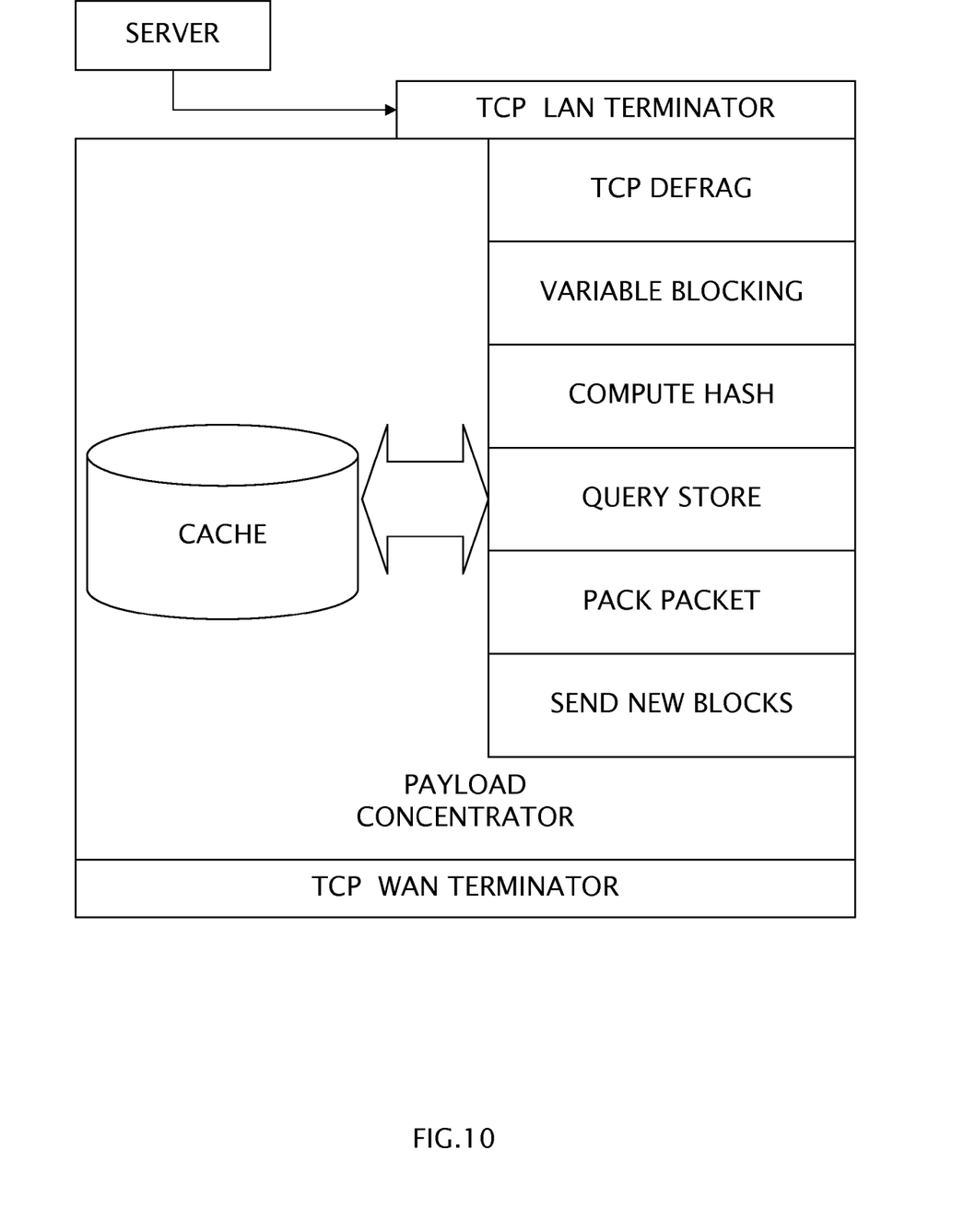
FIG. 10 is flow chart of a method for defragmenting and deduplicating.

FIG. 10 illustrates a method of operating the apparatus. It is understood that a circuit may be embodied as a processor under control of software adapted to perform certain operations. The processes that control a processor to perform the operations of the claimed invention are: terminating a local TCP connection, defragmenting a data object transmitted in a plurality of small TCP packets, variable blocking of the data object, computing a hash for each variable block, querying a store for prior caching of the variable block, packing a packet with the hashes computed from a data object and the remainder of the data object which is not cached, and sending those variable blocks to the destination apparatus not already at the destination apparatus followed by sending the packet with the references. At least one TCP connection with large window is established between the source apparatus and destination apparatus.

The disclosed invention is an apparatus comprising
a circuit to generate a data paragraph, a hash, and a remainder,
a satellite cache store,
a satellite transfer diary store,
and a circuit to pack a plurality of hashes and a remainder into a packet.
The method for operating the above apparatus is
receiving a data object,
generating at least one data paragraph,
computing a hash for each data paragraph,
determining a remainder,
storing a data paragraph into a satellite cache store if the hash is determined to be new,
storing a record into a satellite transfer diary of the destination for each data paragraph, the hash, and the status for transferring the data paragraph to the destination, and
transferring at least one hash and a remainder to a circuit to pack a data object integration packet.
The apparatus further comprises
a circuit for transmission of a pending transfer, and
a circuit for to determine that data paragraphs corresponding to hashes are located at the primary cache store, and
at least one network interface.
The method further comprises the steps
reading a pending status for transfer of a data paragraph,
transferring a data paragraph from a satellite cache store to a primary cache store,
updating the status of the record in satellite transfer diary store from pending to past,
determining that all data paragraphs required for data object integration are stored at the primary cache store, and
enabling transmission of a data object integration packet to the destination.

In an embodiment of the apparatus, the circuit to generate a data paragraph, a hash, and a remainder is coupled to the satellite cache store whereby a data paragraph is stored corresponding to each hash, and the circuit to generate a data paragraph, a hash, and a remainder is coupled to the satellite transfer diary store whereby the destination, the hash, and the status of transferring the data paragraph to the destination is recorded wherein status comprises a past date or pending, and the circuit to generate a data paragraph, a hash, and a remainder is coupled to a circuit to pack hashes and a remainder into a data object integration packet addressed to a destination, whereby duplicative transfer of a data paragraph is avoided if is already stored in the destination cache.

In an embodiment of the apparatus, the circuit for to generate a data paragraph, a hash, and a remainder comprises a circuit to select a string between a minimum length and a maximum length by computing a fingerprint and matching selected bits of the fingerprint to a certain mask by reading from the beginning of a data object or from the end of the previous data paragraph.

In an embodiment of the apparatus, the circuit to generate a data paragraph, a hash, and a remainder comprises a circuit to compute an SHA1 value on a variable length string. In an embodiment of the apparatus the circuit to generate a data paragraph, a hash, and a remainder comprises a circuit to compute an MD5 value on a variable length string. It is understood that other hash functions may be employed within the scope of the invention but that well known hash functions are the best mode presently adopted.

The method further comprises steps within the circuit for to generate a data paragraph, a hash, and a remainder comprising computing a fingerprint and determining a data paragraph on the occurrence of a certain string which may include wildcard characters being matched by a fingerprint or a maximum length being reached. A minimum size for a data paragraph is selected for efficiency and matching the fingerprint will not be done below the minimum size.

The method further comprises steps within the circuit for to generate a data paragraph, a hash, and a remainder comprising determining a data paragraph by using digital signal processing detection of a repeating pattern. In transmitting a two dimensional data object such as a block diagram, a edge detection or line detection operation within a digital signal processor would trigger a data paragraph delimitation.

The method further comprises steps within the circuit for to generate a data paragraph, a hash, and a remainder comprising selecting a plurality of data paragraphs from the start of a data object and on the condition that no more data paragraphs can be selected, assigning the rest of the data object as a remainder and transferring the hashes computed for each data paragraph and the remainder to a circuit for packing a data object integration packet addressed to the destination of the data object.

An apparatus for receiving defragmented and de-duplicated data object packets comprises
at least one network interface,
a primary cache store,
a primary transfer diary store, and
a data object integrator.
The method for operating the above apparatus comprises
receiving and storing into primary cache store at least one data paragraph corresponding to a hash, storing into primary transfer diary store the source apparatus of the paragraph corresponding to the hash and the time of most recent usage, receiving a data object integration packet containing at least one hash and a remainder, and integrating a data object by reading data paragraphs from the primary cache store and concatenating the data paragraphs and the remainder and transferring the reintegrated data object to its original destination local to the receiving apparatus.

The apparatus further comprises a circuit to receive a pending transfer, the circuit to received a pending transfer coupled to a circuit for to transmit a pending transfer, the circuit to receive a pending transfer coupled to a primary transfer diary store, and the circuit to receive a pending transfer coupled to a satellite transfer diary store.

The method further comprises the steps within a circuit to receive a pending transfer:

receiving a hash from a pending transfer transmitter corresponding to a data paragraph, determining from a primary transfer diary store that the hash is already stored in a primary cache store, and transmitting to a satellite transfer store an update on the status of the hash, whereby the satellite transfer diary store changes the status of a pending transfer from pending to past and utilization of a communications channel is optimized by de-duplication.

The principles discussed herein are equally applicable to multiple satellites (not shown) and to multiple primaries (not shown). For example, the VPN defragmentation system may include multiple branch offices and/or multiple central offices coupled to the communication network. Branch office/branch office communication and central office/central office communication, as well as multi-apparatus and/or multi-node communication and bi-directional communication are further within the scope of the disclosure. However, for the sake of simplicity, the disclosure provides the non-limiting illustrative exemplary VPN defragmentation and deduplication system having the single satellite and the single primary, and the respective communication network coupling them.

A communication network comprises hardware and/or software elements that enable the exchange of information (e.g., voice and data) between a satellite and a primary. Some examples of the communication network are SIPRNET, JWICS, and the Internet. Typically connections from the branch office to the communication network are ISDN, T1 lines (1.544 Mbps), and possibly broadband connections such as digital subscriber lines (DSL) and cable modems.

It will be understood that a satellite apparatus and a primary apparatus perform bidirectional communication. For example, a data paragraph sent to the primary apparatus from the satellite apparatus is be stored in a location locally accessible to the primary apparatus and in a location locally accessible to the satellite apparatus. If the data paragraph is to be transferred again from either one to the other, the respective transfer diary store determines that that the pattern is locally accessible and that an additional transfer is unnecessary. The sending apparatus transmits the hash to the destination apparatus which reconstitutes the data object from its cache. Therefore, each apparatus in the VPN defragmentation and deduplication system advantageously uses data paragraphs previously transferred to and from the apparatus to reduce network traffic with other apparatuses in the VPN defragmentation and deduplication system.

A circuit 210 calculates a fingerprint at every byte boundary of a data object to be sent across the communication network. The fingerprints are influenced by preceding bytes in the data flow. For example, the fingerprints are influenced by approximately the n previous bytes, where n determines the fingerprint. In an example 4000 bytes. Some examples of calculating include Rabin's fingerprints and checksums over the previous n bytes of the data flow. In some embodiments, rolling implementations of fingerprints are used where a new byte is added, and a byte from n bytes earlier is removed. When a fingerprint matches a selected trigger value such as bitmask with wildcard characters, a hash is computed and compared with previous hash values stored in a local database.

While hashing and fingerprinting are sometimes confused in the literature because of their similarity, within this patent application we distinguish a fingerprint to be a low cost, efficient computation which allows some risk of collision and a hash to be a more costly computation with proven and quantifiable low risk of collision. The hash value uniquely identifies its data paragraph.

In an embodiment an apparatus includes a processor, a memory, a VPN communication interface, a LAN communication interface, and a transfer diary store. A system bus links the processor, the memory, the VPN communication interface, the LAN communication interface, and the transfer diary store. A high capacity cache store is attached.

The transfer diary store comprises hardware and/or software elements configured to store data in an organized format to allow a processor to create, modify, and retrieve the data. The transfer diary store may organize the data to enable the determination of whether a data paragraph is locally accessible to an apparatus, and to enable quick retrieval of locally accessible data to the apparatus. The hardware and/or software elements of the diary store may include storage devices, such as RAM, hard drives, optical drives, flash memory, and magnetic tape. In some embodiments, the apparatus implements a virtual memory system with linear addresses, the locally accessible data, and large address space.

In an embodiment of the invention disclosed above, a method is disclosed for operating a system to optimize a virtual private network by defragmentation and deduplication of large data transmissions, the system comprising:

a wide area network coupling a satellite apparatus to a primary apparatus, a satellite apparatus comprising:

a circuit to receive a data object and determine a plurality of data paragraphs, a circuit to compute a hash for each data paragraph, a circuit to pack a packet with a plurality of hashes;

a primary apparatus comprising:

a data paragraph cache store, a circuit to receive a packed packet from a satellite apparatus, a circuit to integrate data paragraphs into a data object, and network interfaces and means for sending and receiving TCP packets in each apparatus; the method comprising the steps following opening a virtual private network connection between a satellite apparatus and a primary apparatus, establishing a persistent TCP connection between a satellite apparatus and a primary apparatus through a wide area network, setting a maximum TCP buffer size at both the satellite apparatus and the primary apparatus, setting a TCP window scale to support large transmission sizes, transmitting at least one packed packet comprising a plurality of hashes and a destination IP address between a satellite apparatus and a primary apparatus, within the primary apparatus:

receiving data paragraphs and hashes from a satellite apparatus until all data paragraphs are available, receiving a packed packet comprising a plurality of hashes and a destination IP address, integrating a data object by retrieving data paragraphs from data paragraph cache store and transmitting the data object to the destination IP address;

within the satellite apparatus:

receiving a data object and a destination IP address, determining a plurality of data paragraphs by computing fingerprints on the data object, packing a packet with hashes computed from each data paragraph and with the destination IP address, checking a transfer diary to determine if data paragraphs are available in the primary cache, queuing data paragraphs for transmission to primary cache, transmitting a hash to a primary apparatus for each data paragraph queued for transmission to said primary apparatus, determining that all data paragraphs required for a data object are available at the primary apparatus, and transmitting the packed packet to the primary apparatus.

The method referred to above of determining a plurality of data paragraphs by computing fingerprints on the data object comprises the following steps within the satellite apparatus:

incrementally reading a data object as a string of text, delimiting a data paragraph after a minimum length, delimiting a data paragraph at a maximum length, delimiting a data paragraph upon matching a fingerprint to a masked key prior to the maximum length, computing the fingerprint upon reading each additional byte of the data object after a minimum length and prior to a maximum length, and delimiting a data paragraph upon reaching the end of the data object.

The method referred to above of receiving data paragraphs and hashes from a satellite apparatus until all data paragraphs are available, comprises the steps within the primary apparatus of:

receiving a hash from a satellite apparatus, checking a diary store to determine if a data paragraph having a hash is available, receiving and storing data paragraphs into data paragraph cache store if needed, and signaling to a satellite apparatus when all queued data paragraphs are available in data paragraph cache store.

The disclosed method further comprises the steps of receiving a plurality of packets having a common destination IP corresponding to fragmentation of a data object intended to be transmitted through a virtual private network from a source in a local area network coupled to the satellite apparatus to a destination IP address in a local area network coupled to the primary apparatus, terminating the connection, and defragmenting the data object.

In an embodiment the method is improved by the steps of determining that a data paragraph queued for transmission from a satellite apparatus to a primary apparatus is unnecessary and signaling the satellite apparatus to remove it from the transmission queue.

The apparatus further comprises:

circuits to couple to a local area network attached to the satellite apparatus, and to a local area network attached to the primary apparatus, and to a wide area network attached to both the satellite apparatus and the primary apparatus, a circuit to receive and terminate a TCP connection from a source IP address at the satellite apparatus, a circuit to initiate a TCP connection to a destination IP address at the primary apparatus, and a circuit to open a virtual private network between the satellite apparatus and the primary apparatus, open a persistent TCP connection, set TCP buffer size, set TCP window scale, and negotiate maximum TCP window size.

The apparatus further comprises a circuit to receive and defragment a plurality of packets containing data being transmitted to a destination IP address and combine them into a data object within the satellite apparatus, and a circuit to fragment a data object integrated at a primary apparatus from a plurality of data paragraphs into a plurality of packets and transmit them to a destination IP address.

The apparatus further comprises a circuit to divide a data object into a plurality of data paragraphs, a circuit to compute a hash for each data paragraph using one of MD5 or SHA1, a circuit to pack a packet with the destination IP address for a data object and the hashes of the data paragraphs the data object was divided into and to transmit the packed packet to a primary apparatus, a circuit to receive a packed packet, read data paragraphs from a data paragraph cache store, integrate the data paragraphs into a data object at the primary apparatus, and a data paragraph cache store at each of the satellite apparatus and the primary apparatus.

The apparatus further comprises a circuit to determine if a data paragraph has previously been transmitted to the primary apparatus by the satellite apparatus, queue the data paragraph for transmission, and enable the transmission of the packed packet of hashes upon the condition that the data paragraphs are available at the primary apparatus, a circuit to transmit data paragraphs to the primary apparatus, and a circuit to determine if a data paragraph is available at the primary apparatus and remove it from the transmission queue.

It is known that a circuit embodiment is at least one processor adapted by computer readable instructions encoded on media to perform the steps:

perform VPN and TCP operations, delimit a data object into data paragraphs by fingerprinting, compute hashes for data paragraphs, pack and transmit a packet containing hashes, determine if a data paragraph needs to be transmitted, and when it is available, store and read data paragraphs into and out of data paragraph cache store, integrate data paragraphs into data objects, and transmit a plurality of packets containing a data object to a destination IP, and means for connecting said circuit, cache store, and network interfaces.

An embodiment of the invention comprises a method for operating a transmission apparatus coupled to a local area network and coupled to a wide area network, the apparatus comprising:
  a circuit to generate a data paragraph, a hash, and a remainder,
  a satellite cache store,
  a satellite transfer diary store, and
  a circuit to pack a plurality of hashes and a remainder into a packet;
the method comprising:
  receiving a data object,
  generating at least one data paragraph,
  computing a hash for each data paragraph,
  determining a remainder,
  storing a data paragraph into a satellite cache store if the hash is determined to be new,
  storing a record into a satellite transfer diary of the reception apparatus for each data paragraph, the hash, and the status of the transfer of the data paragraph to the reception apparatus, and
  transferring at least one hash and a remainder to a circuit to pack a data object integration packet.

The transmission apparatus of the invention comprises
  a circuit for transmission of a pending transfer,
  a circuit for to determine when data paragraphs corresponding to hashes are located at primary cache store, and
  at least one network interface.

The method of the invention further comprises the steps within the transmission apparatus:
  reading a pending status for transfer of a data paragraph,
  transferring a data paragraph from a satellite cache store to a primary cache store,
  updating the status of the record in satellite transfer diary store from pending to past,
  determining that all data paragraphs required for data object integration are stored at the primary cache store, and
  enabling transmission of a data object integration packet to the reception apparatus.

In a transmission apparatus the circuit to generate a data paragraph, a hash, and a remainder is coupled to the satellite cache store whereby a data paragraph is stored corresponding to each hash, and the circuit to generate a data paragraph, a hash, and a remainder is coupled to the satellite transfer diary store whereby the reception apparatus, the hash, and the status of the transfer of the data paragraph to the reception apparatus is recorded wherein status comprises a past date or pending, and the circuit to generate a data paragraph, a hash, and a remainder is coupled to a circuit to pack hashes and a remainder into a data object integration packet addressed to a reception apparatus, whereby duplicative transfer of a data paragraph is avoided if it is already stored at the reception apparatus.

In the transmission apparatus the circuit to generate a data paragraph, a hash, and a remainder comprises a circuit to select a string between a minimum length and a maximum length by computing a fingerprint and matching selected bits of the fingerprint to a certain mask by reading from the beginning of a data object or from the end of the previous data paragraph.

In an embodiment of the transmission apparatus, the circuit to generate a data paragraph, a hash, and a remainder comprises a circuit to compute an SHA1 value on a variable length string. In a non-limiting exemplary embodiment of the transmission apparatus, the circuit to generate a data paragraph, a hash, and a remainder comprises a circuit to compute an MD5 value on a variable length string.

The method operates the circuit to generate a data paragraph, a hash, and a remainder by
  computing a fingerprint and
  determining a data paragraph on the occurrence of a certain string being matched by a masked fingerprint or a maximum length being reached.

Alternately, in an embodiment, the method to generate a data paragraph, a hash, and a remainder operates by determining a data paragraph by using digital signal processing detection of a repeating pattern.

The method operates within the circuit to generate a data paragraph, a hash, and a remainder by:
  selecting a plurality of data paragraphs from the start of a data object and
  on the condition that no more data paragraphs can be selected, assigning the rest of the data object as a remainder and
  transferring the hashes computed for each data paragraph and the remainder to a circuit for packing a data object integration packet addressed to the reception apparatus.

The present patent application discloses a method for operating a reception apparatus for receiving defragmented and de-duplicated data object packets, the apparatus comprising:
  at least one network interface,
  a primary cache store,
  a primary transfer diary store, and
  a data object integrator;
the method comprising
  receiving and storing into primary cache store at least one data paragraph corresponding to a hash,
  storing into primary transfer diary store the source of the paragraph corresponding to the hash and the time of most recent usage,
  receiving a data object integration packet containing at least one hash and a remainder, and
  integrating a data object by reading data paragraphs from the primary cache store and concatenating the data paragraphs and the remainder.

The reception apparatus further comprises
  a circuit to receive a pending transfer,
  the circuit to receive a pending transfer coupled to a circuit to transmit a pending transfer,
  the circuit to receive a pending transfer coupled to a primary transfer diary store, and
  the circuit to receive a pending transfer coupled to a satellite transfer diary store.

The method further comprises the steps within a circuit to receive a pending transfer:
  receiving a hash from a pending transfer transmitter corresponding to a dataparagraph,
  determining from a primary transfer diary store that the hash is already stored in a primary cache store, and
  transmitting to a satellite transfer store an update on the status of the hash,
whereby the satellite transfer diary store changes the status of a pending transfer from pending to past and utilization of a communications channel is optimized by de-duplication.

In an embodiment, the method further comprises the steps of checking the most recently used record of every data paragraph stored in cache store, and removing least recently used data paragraphs to provide available storage for new data. In an embodiment the method randomly removes data paragraphs from cache store to provide available storage for new data. In an embodiment the invention includes the steps of storing data paragraphs in cache store into a hierarchical directory and randomly removing an entire sub-directory to provide available storage for new data.

In an embodiment, the method and system operate symmetrically, whereby the primary apparatus receives a data object and transmits the hashes to at least one satellite apparatus.

In an embodiment, the method further comprises the step of synchronizing at least one satellite data paragraph cache store with the primary data paragraph cache store in anticipation of future data transfers.

In an embodiment, the apparatus further comprises a data paragraph cache store and a transfer diary store whereby data paragraphs transmitted from the apparatus can be reused in receiving incoming data objects.

In an embodiment, the apparatus further comprises a circuit for receiving a plurality of packets, a circuit for combining the payload of packets to a data object, a circuit for computing fingerprints of the data object to delimit data paragraphs, whereby a primary apparatus may also transmit data objects to at least one satellite apparatus.

CONCLUSION

The VPN defragmentation and deduplication system advantageously provides increased productivity, reduced IT costs, and enhanced data integrity and compliance. The VPN defragmentation and deduplication system improves application performance and data access in the branch office and central office because not every bit being sent to a destination travels over the communication network each time it is required.

Additionally, the claimed invention does not cache the data in the traditional sense. Some data paragraphs may be retrieved locally even if the URL or filename for the data is different because the data paragraph is identified by a code and not by a URL or filename. Furthermore, unlike web caching, the claimed invention ensures that the data is coherent by forwarding messages (e.g., data requests and responses) between the satellites and the primary. For example, web caching operates by locally intercepting messages for an authoritative source (e.g., a web server) and responding to the messages such that the web server potentially never sees the messages. In some cases, particularly with dynamic content, the locally cached copy may be stale or out-of-date. Advantageously, the VPN defragmentation and deduplication system provides the data coherency and up-to-date data by the transparent operation of the transfer diary store.

Advantageously, the VPN defragmentation and deduplication system improves application performance and data access. In some embodiments, by caching a data paragraph in both the satellite apparatus and the primary apparatus, the VPN defragmentation and deduplication system minimizes the effects of latency and reduces network traffic over the communication network. Additionally, the content of the traffic is obfuscated by the insertion of codes which reference replaced data paragraphs. Furthermore, accelerated access to the data paragraphs locally accessible to the satellite apparatus and the primary apparatus is not limited to a particular application or data context because a certain data paragraph may recur within a webpage, an email, and a spreadsheet shared among many authors and reviewers.

In an embodiment, the VPN defragmentation system includes a secure tunnel between the satellite apparatus and the primary apparatus. The secure tunnel provides encryption (e.g., IPsec) and access control lists (ACLs). Additionally, in other embodiments, the secure tunnel includes compression, such as header and payload compression. The secure tunnel may provide fragmentation/coalescing optimizations along with error detection and correction.

The above-described functions can be comprised of executable instructions that are stored on storage media. The executable instructions can be retrieved and executed by a processor. Some examples of executable instructions are software, program code, and firmware. Some examples of storage media are memory devices, tape, disks, integrated circuits, and servers. The executable instructions are operational when executed by the processor to direct the processor to operate in accord with the invention. Those skilled in the art are familiar with executable instructions, processor(s), and storage media.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for operating a system to optimize a virtual private network by defragmentation and deduplication of large data transmissions, the system comprising: a wide area network coupling a satellite apparatus to a primary apparatus, a satellite apparatus comprising: a circuit to receive a data object and determine a plurality of data paragraphs, a circuit to compute a hash for each data paragraph, a circuit to pack a packet with a plurality of hashes; a primary apparatus comprising: a data paragraph cache store, a circuit to receive a packed packet from a satellite apparatus, a circuit to integrate data paragraphs into a data object, and network interfaces and means for sending and receiving TCP packets in each apparatus; the method comprising:

opening a virtual private network connection between a satellite apparatus and a primary apparatus,
establishing a persistent TCP connection between a satellite apparatus and a primary apparatus through a wide area network,
setting a maximum TCP buffer size at both the satellite apparatus and the primary apparatus,
setting a TCP window scale to support large transmission sizes,
transmitting at least one packed packet comprising a plurality of hashes and a destination IP address between a satellite apparatus and a primary apparatus,
within the primary apparatus:
  receiving data paragraphs and hashes from a satellite apparatus until all data paragraphs are available,
  receiving a packed packet comprising a plurality of hashes and a destination IP address,
  integrating a data object by retrieving data paragraphs from data paragraph cache store and
  transmitting the data object to the destination IP address;
within the satellite apparatus:
  receiving a data object and a destination IP address,
  determining a plurality of data paragraphs by computing fingerprints on the data object,
  packing a packet with hashes computed from each data paragraph and with the destination IP address,
  checking a transfer diary to determine if data paragraphs are available in the primary cache,
  queuing data paragraphs for transmission to primary cache, transmitting a hash to a primary apparatus for each data paragraph queued for transmission to said primary apparatus,
determining that all data paragraphs required for a data object are available at the primary apparatus, and
transmitting the packed packet to the primary apparatus.

2. The method of claim 1 wherein determining a plurality of data paragraphs by computing fingerprints on the data object comprises:
within the satellite apparatus:
incrementally reading a data object as a string of text,
delimiting a data paragraph after a minimum length,
delimiting a data paragraph at a maximum length,
delimiting a data paragraph upon matching a fingerprint to a masked key prior to a maximum length,
computing the fingerprint upon reading each additional byte of the data object after a minimum length and prior to a maximum length, and
delimiting a data paragraph upon reaching the end of the data object.

3. The method of claim 1 wherein receiving data paragraphs and hashes from a satellite apparatus until all data paragraphs are available, comprises
within the primary apparatus:
receiving a hash from a satellite apparatus,
checking a diary store to determine if a data paragraph having a hash is available,
receiving and storing data paragraphs into data paragraph cache store if needed, and
signaling to a satellite apparatus when all queued data paragraphs are available in data paragraph cache store.

4. The method of claim 1 further comprising:
receiving a plurality of packets having a common destination IP corresponding to fragmentation of a data object intended to be transmitted through a virtual private network from a source in a local area network coupled to the satellite apparatus to a destination IP address in a local area network coupled to the primary apparatus,
terminating the connection, and
defragmenting the data object.

5. The method of claim 1 further comprising:
determining that a data paragraph queued for transmission from a satellite apparatus to a primary apparatus is unnecessary and
signaling the satellite apparatus to remove it from the transmission queue.

\* \* \* \* \*